Figure 1:
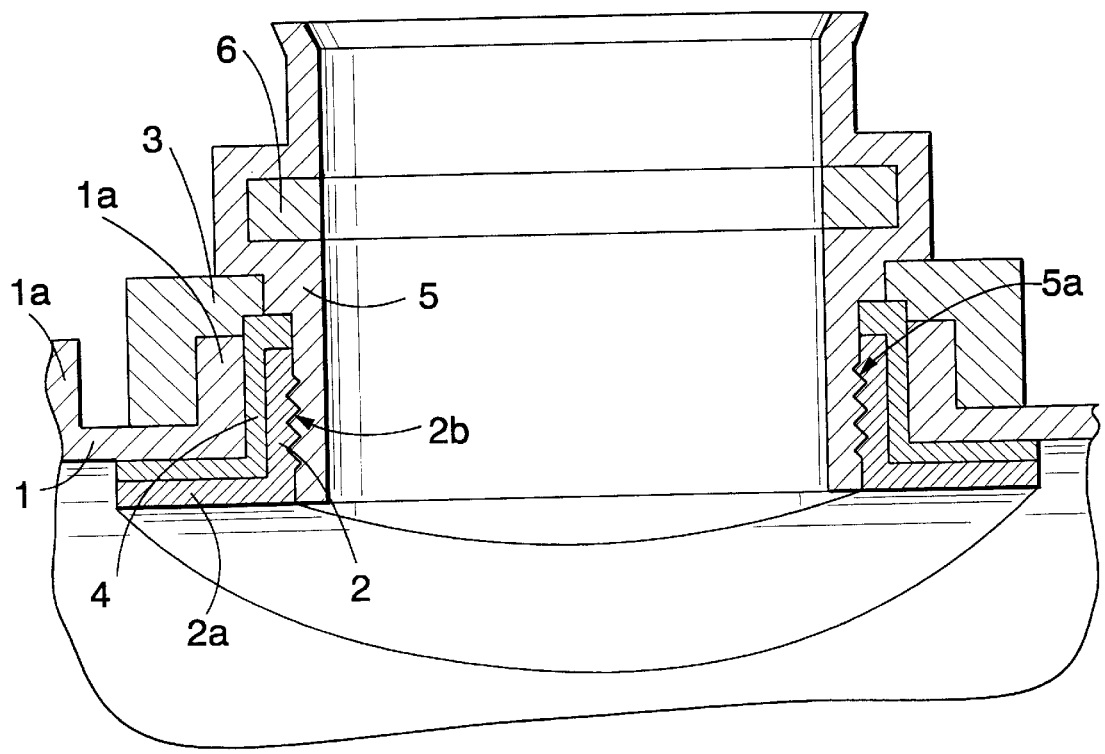

United States Patent

Jäppinen

[11] Patent Number: 6,089,615
[45] Date of Patent: Jul. 18, 2000

[54] BRANCH PIPE CONNECTION

[75] Inventor: Tero Jäppinen, Orimattila, Finland

[73] Assignee: Uponor Innovation AB, Fristad, Sweden

[21] Appl. No.: 09/023,501

[22] Filed: Feb. 13, 1998

Related U.S. Application Data

[60] Provisional application No. 60/062,829, Oct. 17, 1997.

[51] Int. Cl.[7] ................................................. F16L 13/02
[52] U.S. Cl. ................ 285/21.2; 285/125.1; 285/133.21; 285/197; 285/208; 285/423; 285/906; 285/206
[58] Field of Search ..................................... 285/206, 207, 285/208, 209, 210, 21.2, 197, 125.1, 133.21, 423, 906

[56] References Cited

U.S. PATENT DOCUMENTS

| | | | |
|---|---|---|---|
| 3,033,514 | 5/1962 | Grosch | 285/209 X |
| 3,353,849 | 11/1967 | Laurizio | 285/21.2 |
| 3,873,132 | 3/1975 | Czerwiak | 285/21.2 |
| 4,627,648 | 12/1986 | Montpetit | 285/197 |
| 5,375,889 | 12/1994 | Nakashiba et al. | 285/21.2 |
| 5,507,536 | 4/1996 | Oliveto | 285/197 X |
| 5,601,315 | 2/1997 | Bunger et al. | 285/21.2 |

FOREIGN PATENT DOCUMENTS

| | | | |
|---|---|---|---|
| 628853 | 3/1963 | Belgium | 285/208 |
| 0268543 | 5/1988 | European Pat. Off. . | |
| 0506181 | 9/1992 | European Pat. Off. . | |
| 0623200 | 5/1997 | European Pat. Off. . | |
| 71405 | 9/1986 | Finland . | |
| 2557255 | 8/1986 | France . | |
| 6201083 | 7/1994 | Japan | 285/197 |
| 2120340 | 11/1983 | United Kingdom | 285/197 |
| 2120340 | 11/1985 | United Kingdom . | |
| 9107619 | 5/1991 | WIPO . | |
| 9510727 | 4/1995 | WIPO . | |

*Primary Examiner*—Dave W. Arola
*Attorney, Agent, or Firm*—Ladas & Parry

[57] ABSTRACT

The present invention relates to a branch pipe connection including a locking ring and a sleeve that are arranged against one another and can be tightened in their axial direction. The connection further includes a support flange. The locking ring is of such a flexible material that the locking ring can be placed inside a pipe or the like through a hole made for the branch pipe from outside the pipe or the like, although the smallest outer diameter of the flange of the locking ring is larger than the largest diameter of the hole.

19 Claims, 2 Drawing Sheets

BRANCH PIPE CONNECTION

This application claims benefit of provisional application 60/062,829 filed Oct. 17, 1997.

The invention relates to a branch pipe connection, which connection includes a locking ring to be placed in a hole made in a wall of a pipe or the like, the smallest outer diameter of a flange of the locking ring being larger than the largest diameter of the hole, a sleeve or a branch pipe arranged against the locking ring, and a support flange situated between the pipe or the like and a shoulder of the sleeve or the branch pipe.

WO Patent Application 91/07619 shows a connection for connecting a branch pipe to a sewage pipe. In the connection the end of the branch pipe is pushed inside the single branch to produce a telescopic connection. A sealing flange is arranged outside the connection and settled tightly by heating on top of a corrugated pipe, for example. At the connection point the ring stiffness of the sewage pipe is rather weak after the connection has been made. The connection is difficult to be produced and it cannot be easily dismounted subsequently.

European Patent Application 0 506 181 discloses a pipe connection where the pipe fitting is pushed to an opening made in a sewage pipe, where the end of the pipe fitting inside the sewage pipe is expanded. It is rather laborious and difficult to produce the connection and the connection cannot be dismounted subsequently. Even in this case the ring stiffness of the sewage pipe is rather weak at the connection point.

WO Patent Application 95/10727 shows a pipe connection used especially in association with relined sewage pipes. In the connection the single branch is pushed inside the sewage pipe and the flange is fused on the inner surface of the sewage pipe by electric heating. It is rather difficult to use the method and there may be problems with the durability of the connection under severe conditions. The ring stiffness of the sewage pipe cannot either be improved.

European Patent Application 0 268 543, U.S. Pat. No. 4,627,648, Finnish Patent 71,405 and French Patent 2,557,255 disclose various pipe connections where a sleeve of the single branch is pushed inside a hole in the sewage pipe. All these connections have it in common that the flange of the single branch is sealed at its outer surface against the sewage pipe. The solutions are difficult in structure and they are not suitable for connecting a branch pipe to a lightly constructed underground sewage and drainage pipe.

European Patent Specification 0 623 200 shows a pipe connection where a branch pipe to be mounted at an oblique angle is connected to a pipe having a larger diameter. An aperture of elliptic shape is made in the pipe having a larger diameter, in which case the largest diameter of the aperture has to be larger than the smallest outer diameter of the flange of the branch pipe. In this way the aperture will be relatively large and thus the structure of the pipe, ring stiffness, for example, will weaken.

UK Patent 2 120 340 teaches a pipe joint where an inner part provided with a slit is first mounted through a hole made in the sewage pipe inside the sewage pipe. The joint further comprises an external flange and a shoulder to be screwed inside the inner part. The joint can also be made from outside the sewage pipe but it is only intended for inside sewage pipes having a smooth surface. Furthermore, as the joint is arranged to be sealed by means of the outermost flange to the outer surface of the sewage pipe, the joint cannot be applied to connect the branch pipe to a lightly constructed underground sewage and drainage pipe whose outer surface has a varying profile, because it is practically impossible to seal the surface by the sealing of the cited UK Patent. It is not useful to make a varying profile for the sealing because the shape of the required sealing would vary according to the location of the hole to be made. The use of silicone or other sealing compounds does not either ensure a sufficiently good result and it is also very difficult to use them.

It is an object of the present invention to produce a steady pipe connection for connecting a branch pipe to a sewage pipe or the like.

The branch pipe connection of the invention is characterized in that the locking ring forms a uniform ring and the locking ring is of a flexible material for mounting the locking ring in the hole in the pipe or the like from outside the pipe or the like.

An essential idea of the invention is that the connection includes a locking ring forming a uniform ring and a sleeve and a branch pipe which are arranged against one another and which can be tightened in their axial direction. The connection further includes a support flange to be placed outermost. A further essential idea is that the locking ring is of such a flexible material that the locking ring can be placed inside the sewage pipe or the like through a hole made for the branch pipe, although the smallest outer diameter of the flange of the locking ring is larger than the largest diameter of the hole made for the branch pipe. An idea of one preferred embodiment is that the pipe connection includes a sealing arranged between the inner surface of the sewage pipe or the like and the flange of the locking ring.

An advantage of the invention is that the connection can be made to the sewage pipe or the like from outside. A further advantage is that by means of the connection, the sewage pipe can be re-rounded and the ring stiffness of the sewage pipe can be improved at the same time. The hole made for the locking ring can be rather small. The connection also has a great bending stiffness. The connection can be further dismounted and lightly constructed underground sewage and drainage pipes can be sealed very simply with it.

In the present application, the term 'lightly constructed underground sewage and drainage pipe' refers to sewage pipes whose walls are provided for example with ribbed flanges or corrugation to improve ring stiffness of a sewage pipe to the effect that the actual wall of the sewage pipe is reasonably thin and the inner surface is substantially smooth but because of ribbed flanges or corrugation its outer surface can have a varying profile.

The invention will be explained in more detail in the appended drawings where

Figure 2:
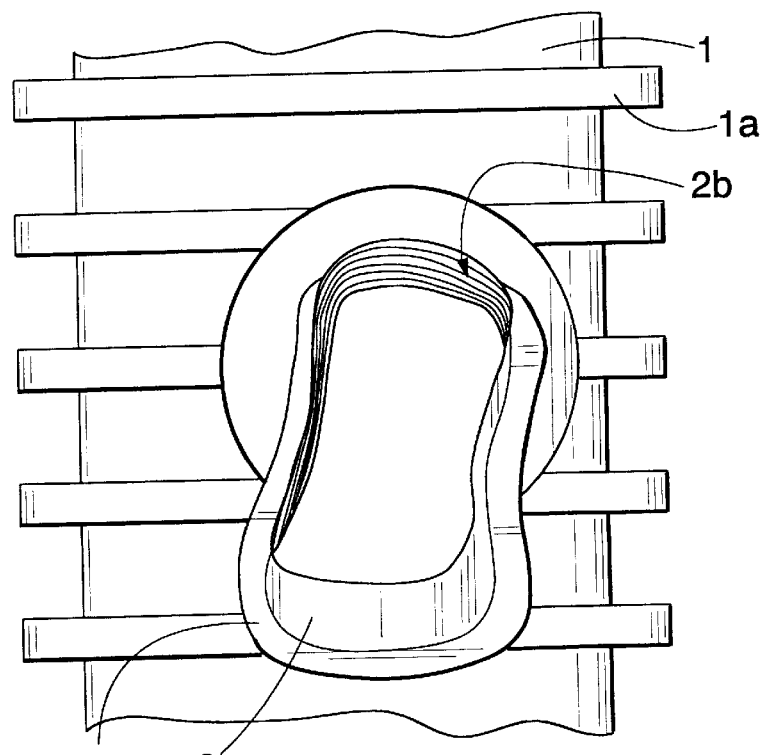
Figure 3:
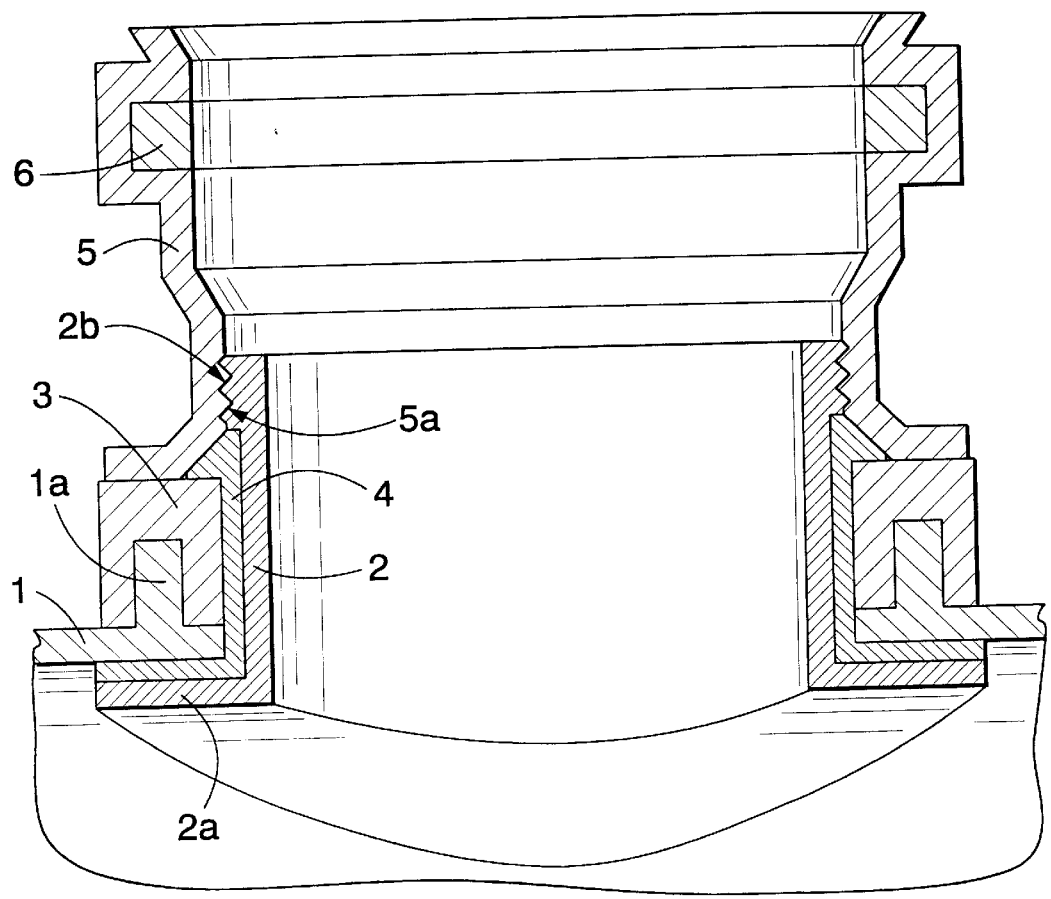

FIG. 1 is a schematic sectional side view of a pipe connection of the invention, FIG. 2 shows the mounting of a locking ring of the pipe connection of FIG. 1, and FIG. 3 is a schematic sectional side view of another pipe connection of the invention.

FIG. 1 shows a pipe connection made to a lightly constructed underground sewage and drainage pipe 1. The underground sewage and drainage pipe 1 has ribbed flanges 1a. The connection comprises a locking ring 2 which forms a uniform, e.g., circumferentially continuous ring and which has a flange 2a in the end which is inside the underground sewage and drainage pipe 1. The outer diameter of the flange 2a is larger than the diameter of the hole made in the underground sewage and drainage pipe 1 for connecting the branch pipe. The hole can be round or it can be slightly elliptical in shape, for example, in which case the smallest outer diameter of the flange 2a of the locking ring 2 is larger than the largest diameter of the hole. For this reason, the locking ring 2 is of such a flexible material that it can be momentarily compressed in one direction smaller than its normal circumference, in which case the locking ring 2 can be mounted inside the underground sewage and drainage pipe 1 through a hole made therein as shown in FIG. 2. When the locking ring 2 is mounted inside the pipe 1, it recovers its original shape. The pipe 1 can also be somewhat flexible, in which case the possible hole therein can be slightly enlarged for the duration of mounting.

After the locking ring 2 is mounted, a support flange 3 is mounted in the connection. After the support flange 3 is mounted, a sealing member 4 of rubber, for example, and after it a sleeve 5 are mounted. The locking ring 2 has internal threads 2b and the sleeve 5 similarly external threads 5a, in which case the sleeve 5 can be threaded inside the locking ring 2. The sleeve 5 includes a shoulder arranged to be pressed above the support flange 3, in which case when the sleeve 5 is threaded, it presses the support flange 3 against the underground sewage and drainage pipe 1 from outside and the locking ring 2 against the underground sewage and drainage pipe 1 from inside.

The sealing member 4 is arranged to be annular and extend from the inner surface of the underground sewage and drainage pipe 1 as far as the sleeve 5. The upper surface of the sealing 4 against the sleeve 5 has a sliding surface, because of which when the sleeve 5 is threaded, it slides on the sealing 4 without substantially clinging to it. The lower part of the sealing 4 has a flange arranged against the inner surface of the underground sewage and drainage pipe 1. Instead of a uniform sealing member 4, it is also possible to use two separate sealing members (not shown), for example, to the effect that one sealing member is between the flange 2a and the inner surface of the pipe 1 and the other between the sleeve 5 and the upper edge of the locking ring 2. In pipes with a smooth outer surface, it is possible to use instead of a sealing member inside the pipe 1 an external sealing member between the outer surface of the pipe 1 and the support flange 3.

The flange 2a can comprise means for fusing or welding the flange to the inner surface of the pipe 1, in which case the sealing will be tight and steady. In addition to or instead of this solution, the sealing member 4 can also be arranged to form an electrofusion element.

The sleeve 5 is also provided with a recess to which a sealing member 6 is arranged for sealing the branch pipe inside the sleeve 5. The branch pipe is not shown in the accompanying figures for the sake of clarity.

FIG. 3 shows another pipe connection of the invention. The numbering in FIG. 3 corresponds to the numbering in FIGS. 1 and 2. The pipe connection of FIG. 3 corresponds to the pipe connection of FIG. 1 in other respects except that the locking ring 2 is arranged somewhat higher and the threads 2b are arranged on its outer surface. Correspondingly, the threads 5a to the sleeve 5 are arranged to the inner surface of the sleeve 5, in which case the sleeve 5 is threaded to the outside of the locking ring 2. The pipe connection is somewhat higher than the pipe connection of FIG. 1, but in the case of FIG. 3 the hole made in the underground sewage and drainage pipe 1 can be of the same size as the outer diameter of the branch pipe.

The lower part of the sealing member 4 has a similar flange as in the case of FIG. 1. At its upper end the sealing member 4 has a conical part with a sliding surface which allows the sleeve 5 to be rotated easily.

The drawing and the specification relating thereto are only intended to illustrate the idea of the invention. In its details, the invention can vary within the scope of the present claims. For this reason, the sleeve 5 is not necessarily required but instead, the end of the branch pipe can be formed to correspond to the shape of the sleeve 5 shown in the figure. The threads 2b and 5a can be omitted, when required, in which case any mechanical connection or an adhesive joint can be arranged in their place. The sleeve 5 and the locking ring 2 can also have a uniform structure. This relates in particular to solutions where the locking ring 2 is attached to the inner surface of the pipe or the like by welding or gluing. The outer surface of the sleeve 5 and the locking ring 2 can be clearly smaller than the diameter of the hole, in which case the fitting can be positioned into a suitable place with respect to the hole. In FIGS. 1 and 3, the sleeve 5 is drawn perpendicular with respect to the wall of the pipe 1. This is not necessary but the sleeve can also be at another angle, such as 30° or 45° with respect to the wall of the pipe 1. Most preferably the locking ring 2 and the other parts of the connection are of plastic, but when required, all parts can be of any material suitable for the purpose. The flange 2a of the locking ring 2 can have a corrugated surface, in which case it is also possible by means of the solution of the invention to connect a branch pipe to a pipe having a corrugated inner surface. The scope of the invention is not restricted to plastic pipes but the invention is suitable for connections of concrete and clay pipes with thick walls and vertical pipes of drain well. By means of the solution of the invention, the branch pipe can be connected, in addition to a pipe, to a tank having a curved surface or even straight walls.

What is claimed is:

1. A branch pipe connection, which connection includes a locking ring having a flange to be placed in a hole made in a wall of a pipe or pipe-like element, the smallest outer diameter of the flange being larger than the largest diameter of the hole, a sleeve or branch pipe having a shoulder, wherein at least one of the locking ring and sleeve or branch pipe end have an interconnection structure for interconnection to the other, and a support flange to support the shoulder from the pipe or pipe-like element, wherein the locking ring forms a uniform ring and the locking ring is of a flexible material for mounting the locking ring in the hole in the pipe or pipe-like element from outside the pipe or pipe-like element.

2. A branch pipe connection according to claim 1, wherein the sleeve or the branch pipe is arranged inside the locking ring.

3. A branch pipe connection according to claim 1, wherein the locking ring is arranged inside the sleeve or the branch pipe.

4. A branch pipe connection according to claim 1, wherein the locking ring and the sleeve or the branch have threads for tightening the locking ring and the sleeve or the branch pipe against one another in their axial direction.

5. A branch pipe connection according to claim 1, wherein the connection includes a sealing member between the flange of the locking ring and the inner surface of the pipe or pipe-like element.

6. A branch pipe connection according to claim 1, and further comprising a portion of the flange for fusing or welding to the inner surface of the pipe or pipe-like element.

7. A branch pipe connection according to claim 5, wherein the sealing member is an electrofusion element.

8. In a connector for connection to a hole in an side of a first pipe, the improved connector comprising:
 a locking ring having one axial end for locating in the hole in the side of the first pipe coaxially with the hole and an opposite axial end for projecting from the first pipe;

a first flange on the one end of the locking ring, a smallest outer diameter of the first flange being larger than a largest diameter of the hole;

a sleeve or branch pipe end having an external shoulder; and a support flange between the shoulder of the sleeve or branch pipe end and an outside of the first pipe, wherein at least one of the locking ring and sleeve or branch pipe end have an interconnection structure for interconnection to the other, wherein the locking ring and first flange are circumferentially continuous and sufficiently flexible for the locating, and wherein at least one of the interconnection structure and first flange have a structure for securing the connection to the first pipe.

9. The connector according to claim 8, and further comprising a sealing member between at least one of (a) the first flange and an inside of the first pipe and (b) the locking ring and sleeve or branch pipe end.

10. The connector according to claim 9, wherein the sealing member is an electrofusion element.

11. The connector according to claim 9, wherein the interconnection structure and structure for securing to the first pipe comprise threads for tightening the locking ring and sleeve or branch pipe end axially to each other.

12. The connector according to claim 11, wherein the sealing member is an electrofusion element.

13. The connector according to claim 11, wherein the structure for securing to the first pipe comprises a portion of the first flange for welding to the first pipe.

14. The connector according to claim 13, wherein the sealing member is an electrofusion element.

15. The connector according to claim 9, wherein the structure for securing to the first pipe comprises a portion of the first flange for welding to the first pipe.

16. The connector according to claim 15, wherein the sealing member is an electrofusion element.

17. The connector according to claim 8, wherein the interconnection structure and structure for securing to the first pipe comprise threads for tightening the locking ring and sleeve or branch pipe end axially to each other.

18. The connector according to claim 17, wherein the structure for securing to the first pipe comprises a portion of the first flange for welding to the first pipe.

19. The connector according to claim 8, wherein the structure for securing to the first pipe comprises a portion of the first flange for welding to the first pipe.

* * * * *